(12) United States Patent
Kubota et al.

(10) Patent No.: US 7,709,563 B2
(45) Date of Patent: May 4, 2010

(54) AQUEOUS DISPERSION TYPE FLUORINE-CONTAINING WATER- AND-OIL REPELLENT COMPOSITION HAVING A POLYMER OF A PERFLUOROALKYL GROUP- CONTAINING ETHEYLENICALLY UNSATURATED MONOMER, A NONIONIC SURFACTANT ANA CATIONIC SURFACTANT, AND PREPARATION AND USE THEREOF

(75) Inventors: Kouji Kubota, Settsu (JP); Takuya Yoshioka, Settsu (JP); Masato Kashiwagi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/470,305

(22) PCT Filed: Jan. 29, 2002

(86) PCT No.: PCT/JP02/00624

§ 371 (c)(1),
(2), (4) Date: Jul. 29, 2003

(87) PCT Pub. No.: WO02/064696

PCT Pub. Date: Aug. 22, 2002

(65) Prior Publication Data

US 2004/0075074 A1 Apr. 22, 2004

(30) Foreign Application Priority Data

Jan. 30, 2001 (JP) .......................... P2001-021590

(51) Int. Cl.
*C08K 5/19* (2006.01)
*C08K 5/06* (2006.01)
*C08L 27/12* (2006.01)
*D06M 15/277* (2006.01)

(52) U.S. Cl. ...................... 524/251; 524/317; 524/378; 524/544; 524/714; 524/760; 252/8.62

(58) Field of Classification Search ................. 524/753, 524/755, 770, 805, 300, 316, 236, 543, 544, 524/251, 317, 378, 714, 760; 252/8.62
See application file for complete search history.

(56) References Cited

U.S. PATENT DOCUMENTS

| | | | | |
|---|---|---|---|---|
| 4,590,236 A * | 5/1986 | Konig et al. | ................. | 524/460 |
| 5,093,398 A * | 3/1992 | Rottger et al. | ............... | 524/322 |
| 5,350,795 A * | 9/1994 | Smith et al. | .................. | 524/507 |
| 5,876,617 A | 3/1999 | Sato et al. | | |
| 5,883,175 A * | 3/1999 | Kubo et al. | .................. | 524/458 |
| 6,126,849 A * | 10/2000 | Yamana et al. | ............. | 252/8.62 |
| 6,136,896 A * | 10/2000 | Lee et al. | ......... | 524/27 |
| 6,156,389 A * | 12/2000 | Brown et al. | ............. | 427/393.4 |
| 6,284,367 B1 * | 9/2001 | Gruhn et al. | .......... | 428/355 AC |
| 2001/0009712 A1 * | 7/2001 | Totani et al. | ................. | 428/195 |
| 2003/0129419 A1 * | 7/2003 | Chen | .......................... | 428/447 |

FOREIGN PATENT DOCUMENTS

| | | |
|---|---|---|
| EP | 0 208 421 A2 | 1/1987 |
| EP | 0 436 327 A1 | 7/1991 |
| EP | 0 438 886 A1 | 7/1991 |
| EP | 0 818 506 A1 | 1/1998 |
| EP | 818506 A1 | 1/1998 |
| EP | 0 902 073 A2 | 3/1999 |
| EP | 902073 A2 | 3/1999 |
| EP | 0 964 032 A1 | 12/1999 |
| EP | 0 984 024 A1 | 3/2000 |
| JP | 58-71977 | 4/1983 |
| JP | 62-15384 | 1/1987 |
| JP | 63-67511 | 12/1988 |
| JP | 3-193972 | 8/1991 |
| JP | 3-193975 | 8/1991 |
| JP | 4-164990 | 6/1992 |
| JP | 04-164990 A * | 6/1992 |
| JP | 6-33043 | 2/1994 |
| JP | 6-33043 A | 2/1994 |
| JP | 7-228638 | 5/1995 |
| JP | 7-228864 | 8/1995 |
| JP | 7-278442 | 10/1995 |
| JP | 8-509034 | 9/1996 |
| JP | 10-81873 | 3/1998 |
| JP | 10-237133 A | 9/1998 |
| JP | 10-273879 | 10/1998 |
| JP | 2000-144119 | 5/2000 |
| WO | WO 94/24179 | 10/1994 |
| WO | WO 00/43462 | 7/2000 |
| WO | WO 00/43462 A1 | 7/2000 |

OTHER PUBLICATIONS

Translation of JP 04-164990 (1992) [translated by the McElroy Translation Company].*
International Search Report for PCT/JP02/00624 dated Mar. 5, 2002.
International Search Report PCT/JP02100624 dated Mar. 05, 2002.
English language translation of International Preliminary Examination Report for PCT/JP02/00624 dated Jul. 24, 2002.

* cited by examiner

*Primary Examiner*—Vickey Nerangis
(74) *Attorney, Agent, or Firm*—Sughrue Mion, PLLC

(57) ABSTRACT

An aqueous dispersion type fluorine-containing water- and oil-repellent composition containing a polymer of a perfluoroalkyl group-containing ethylenically unsaturated monomer dispersed in an aqueous medium. The composition also contains a nonionic surfactant having an HLB value of at most 11 and a cationic surfactant. A homopolymer of at least one monomer constituting the polymer has Tg of at most 50° C.

18 Claims, No Drawings

AQUEOUS DISPERSION TYPE FLUORINE-CONTAINING WATER- AND-OIL REPELLENT COMPOSITION HAVING A POLYMER OF A PERFLUOROALKYL GROUP- CONTAINING ETHEYLENICALLY UNSATURATED MONOMER, A NONIONIC SURFACTANT ANA CATIONIC SURFACTANT, AND PREPARATION AND USE THEREOF

This application is a national stage of International Application No. PCT/JP02/00624, filed Jan. 29, 2002, which claims priority from Japanese Application No. P2001-021590, filed Jan. 30, 2001.

FIELD OF THE INVENTION

The present invention relates to a water- and oil-repellent composition. Particularly, the present invention relates to an aqueous dispersion type water- and oil-repellent composition having the improved water- and oil-repellency under low temperature curing conditions.

Background Art

An aqueous dispersion type fluorine-containing water- and oil-repellent is generally used. Various attempts have been made to improve properties obtained by curing at a low temperature. The polymer structures are devised in, for example, JP-B-63-67511 (a graft polymer comprising a diene monomer, ether group-containing (meth)acrylate and a fluoromonomer) and JP-A-10-237133 (fluroalkyl acrylate (FA)/stearyl acrylate (StA)/chloroethyl vinyl ether/N-methylol acrylamide (N-MAM, etc.). However, the conventional procedures cannot give sufficient water- and oil-repellency obtained by curing at low temperature. In particular, it is difficult to impart sufficient properties to a polyolefin fiber.

JP-A-4-164990 discloses a composition comprising a non-ionic surfactant having an HLB value of at most 10 in addition to a fluorine-containing cationic surfactant and a fluorine-free cationic surfactant. JP-A-4-164990 has the object of improving the dispersion stability, but does not disclose the improvement of the water- and oil-repellency properties.

The conventional aqueous dispersion type fluorine-containing water- and oil-repellent agents have insufficient water- and oil-repellency obtained by curing at low temperature. A water- and oil-repellent agent which can exhibit excellent water- and oil-repellency obtained by drying or heat-treatment at low temperature is desired. In particular, it is highly desirable to give the water- and oil-repellent agent imparting excellent water- and oil-repellency to a polyolefin fiber which has low heat-resistance of fiber itself and which cannot be cured at high temperature.

SUMMARY OF THE INVENION

The present inventors discovered that, when an aqueous dispersion type water- and oil-repellent agent comprising a homopolymer or copolymer of a perfluoroalkyl group-containing ethylenically unsaturated monomer dispersed in an aqueous medium contains a specified emulsifier having a low HLB value, the water- and oil-repellent agent can exhibit excellent performances even if the agent is cured at low temperature, and then completed the present invention.

That is, the present invention provides an aqueous dispersion type fluorine-containing water- and oil-repellent composition comprising a polymer of a perfluoroalkyl group-containing ethylenically unsaturated monomer dispersed in an aqueous medium, wherein the composition contains a non-ionic surfactant having an HLB value of at most 11 and a cationic surfactant, and a homopolymer of at least one monomer constituting the polymer has a glass transition temperature (Tg) of at most 50° C.

Further, the present invention provides a method of producing said composition, a water- and oil-repelling treatment method using said composition and a treated article.

DETAILED EXPLANATION OF THE INVENTION

As the HLB value, adopted is a value shown in a brochure when the brochure shows the HLB value, and is a measured value (measured according to W. G. Griffin, J. Soc. Cosmetic Chemists, 1, 311 (1949) and W. G. Griffin, J. Soc. Cosmetic Chemists, 5, 249 (1954)) when brochures do not show an HLB value.

Specific examples of the nonionic surfactant used in the present invention include polyoxyethylene lauryl ether, polyoxyethylene tridecyl ether, polyoxyethylene cetyl ether, polyoxyethylene polyoxypropylene cetyl ether, polyoxyethylene stearyl ether, polyoxyethylene oleyl ether, polyoxyethylene nonyl phenyl ether, polyoxyethylene octyl phenyl ether, polyoxyethylene monolaurate, polyoxyethylene monostearate, polyoxyethylene mono-oleate, sorbitan monolaurate, sorbitan monostearate, sorbitan monopalmitate, sorbitan monostearate, sorbitan mono-oleate, sorbitan sesqui-oleate, sorbitan trioleate, polyoxyethylene sorbitan monolaurate, polyoxyethylene sorbitan monopalmitate, polyoxyethylene sorbitan monostearate, polyoxyethylene sorbitan mono-oleate, polyoxyethylene polyoxypropylene block polymer, polyglycerin fatty acid ester, polyether-modified silicone oil (SH3746, SH3748, SH3749 and SH3771 manufactured by Toray Dow Corning Silicone Co., Ltd.), perfluoroalkyl ethylene oxide adduct (UNIDYNE DS-401 and DS403 manufactured by Daikin Industries, Ltd.), fluoroalkyl ethylene oxide adduct (UNIDYNE DS406 manufactured by Daikin Industries, Ltd.), and perfluoroalkyl oligomer (UNIIDYNE DS-451 manufactured by Daikin Industries, Ltd.).

A preferable structure of the nonionic surfactant includes polyoxyethylene dialkylate, polyoxyethylene monoalkylate, polyoxyalkylene alkyl ether and sorbitan alkylate.

Most preferable specific examples of the nonionic surfactant include polyoxyethylene (POE) (8) distearate, polyoxyethylene (POE) (5) dilaurate, POE (2-6) monostearate, POE (6) monooleate, POE (3-5) alkyl ether and POE (2) cetyl ether.

The HLB value of the nonionic surfactant is at most 11, preferably at most 9.

An other nonionic surfactant having an HLB value of more than 11 may be used together with the nonionic surfactant having the HLB value of at most 11 (preferably at most 9), but the other nonionic surfactant preferably has the HLB value between 9 and 13, for example between 11 and 13.

When the combination of the nonionic surfactant having low HLB value and the nonionic surfactant having high HLB value is used, the amount of the nonionic surfactant having the HLB value of at most 9 is preferably at least 60% by weight, more preferably at least 80% by weight, based on the total of the nonionic surfactants. The nonionic surfactant having the HLB value of at most 9 alone may be used as the nonionic surfactant.

The amount of the nonionic surfactant having the HLB value of at most 11 (preferably at most 9) is from 0.1 to 100 parts by weight, based on 100 parts by weight of the polymer.

The nonionic surfactant is combinedly used together with the cationic surfactant. The cationic surfactant may be either a fluorine-containing cationic surfactant or a fluorine-free cationic surfactant.

Specific examples of the cationic surfactant used in the present invention include dialkyl ($C_{12}$-$C_{22}$) dimethyl ammonium chloride, alkyl (coconut) dimethyl benzyl ammonium chloride, octadecyl amine acetate salt, tetradecyl amine acetate salt, tallow alkyl propylene diamine acetate salt, octadecyl trimethyl ammonium chloride, alkyl (tallow) trimethyl ammonium chloride, dodecyl trimethyl ammonium chloride, alkyl (coconut) trimethyl ammonium chloride, hexadecyl trimethyl ammonium chloride, biphenyl trimethyl ammonium chloride, alkyl (tallow) imidazoline quaternary salt, tetradecyl dimethyl benzyl ammonium chloride, octadecyl dimethyl benzyl ammonium chloride, dioleyl dimethyl ammonium chloride, polyoxyethylene dodecyl monomethyl ammonium chloride, polyoxyethylene alkyl ($C_{12}$-$C_{22}$) benzyl ammonium chloride, polyoxyethylene lauryl monomethyl ammonium chloride, 1-hydroxyethyl-2-alkyl (tallow) imidazoline quaternary salt, a silicone-based cationic surfactant having a siloxane group as a hydrophobic group, and a fluorine-based cationic surfactant having a fluoroalkyl group as a hydrophobic group (DYNE DS-202 manufactured by Daikin Industries, Ltd.).

Preferable specific examples of the cationic surfactant are monoalkyltrimethyl ammonium salt and dialkyldimethyl ammonium salt. Most preferable specific examples include stearyltrimethyl ammonium chloride, lauryl trimethylammonium chloride, di-harden tallow alkyl dimethyl ammonium chloride and distearyl dimethyl ammonium chloride.

Non-limiting examples of the perfluroalkyl group-containing ethylenically unsaturated monomer are as follows:

The perfluroalkyl group-containing ethylenically unsaturated monomer is preferably a (meth)acrylate ester containing a perfluroalkyl group. The perfluroalkyl group-containing ethylenically unsaturated monomer is preferably of the formula:

$$Rf—R^1—OCOC(R^2)=CH_2$$

wherein Rf is a linear or branched perfluoroalkyl group having 3 to 20 carbon atoms;

$R^1$ is a linear or branched alkylene group having 1 to 20 carbon atoms, a group of the formula: —$SO_2N(R^3)R^4$— or a group of the formula: —$CH_2CH(OR^5)CH_2$— in which $R^3$ is an alkyl group having 1 to 10 carbon atoms, $R^4$ is a linear or branched alkylene group having 1 to 10 carbon atoms, and $R^5$ is a hydrogen atom or an acyl group having 1 to 10 carbon atoms; and $R^2$ is a hydrogen atom or a methyl group.

Non-limiting specific examples of the monomer containing the perfluoroalkyl group are as follows:

$CF_3(CF_2)_7(CH_2)_{10}OCOCH=CH_2$
$CF_3(CF_2)_7(CH_2)_{10}OCOC(CH_3)=CH_2$
$CF_3(CF_2)_6CH_2OCOCH=CH_2$
$CF_3(CF_2)_8CH_2OCOC(CH_3)=CH_2$
$(CF_3)_2CF(CF_2)_6(CH_2)_2OCOCH=CH_2$
$(CF_3)_2CF(CF_2)_8(CH_2)_2OCOCH=CH_2$
$(CF_3)_2CF(CF_2)_{10}(CH_2)_2OCOCH=CH_2$
$(CF_3)_2CF(CF_2)_6(CH_2)_2OCOC(CH_3)=CH_2$
$(CF_3)_2CF(CF_2)_8(CH_2)_2OCOC(CH_3)=CH_2$
$(CF_3)_2CF(CF_2)_{10}(CH_2)_2OCOC(CH_3)=CH_2$
$CF_3CF_2(CF_2)_6(CH_2)_2OCOCH=CH_2$
$CF_3CF_2(CF_2)_8(CH_2)_2OCOCH=CH_2$
$CF_3CF_2(CF_2)_6(CH_2)_2OCOCH=CH_2$
$CF_3CF_2(CF_2)_6(CH_2)_2OCOC(CH_3)=CH_2$
$CF_3CF_2(CF_2)_8(CH_2)_2OCOC(CH_3)=CH_2$
$CF_3CF_2(CF_2)_{10}(CH_2)_2OCOC(CH_3)=CH_2$
$CF_3(CF_2)_7SO_2N(CH_3)(CH_2)_2OCOCH=CH_2$
$CF_3(CF_2)_7SO_2N(C_2H_5)(CH_2)_2OCOCH=CH_2$
$(CF_3)_2CF(CF_2)_8CH_2CH(OCOCH_3)CH_2OCOC(CH_3)=CH_2$
$(CF_3)_2CF(CF_2)_6CH_2CH(OH)CH_2OCOCH=CH_2$.

The perfluroalkyl group-containing ethylenically unsaturated monomer may be a monomer having a urethane or urea bond and a fluoroalkyl group.

The monomer having the urethane or urea bond and the fluoroalkyl group may be, for example, a compound of the general formula:

$$Rf^1—X^1-A^1-CONH—Y^1—NHCO-A^2-O—C(=O)—CR^3=CH_2$$

wherein $Rf^1$ is a linear or branched perfluoroalkyl group having 3 to 20 carbon atoms;

$X^1$ is —$R^1$—, —$CON(R^2)$-$Q^1$- or —$SO_2N(R^2)$-$Q_1$-, in which $R^1$ is an alkylene group, $R^2$ is a hydrogen atom or a lower alkyl group and $Q^1$ is an alkylene group;

$A^1$ is —O—, —S— or —$N(R^2)$—, in which $R^2$ is a hydrogen atom or a lower alkyl group;

$Y^1$ is a residue remaining after removing an isocyanate from an aromatic or alicyclic diisocyanate;

$A^2$ is a bivalent organic group having 2 to 9 carbon atoms and capable of containing at least one oxygen atom; and $R^3$ is a hydrogen atom or a methyl group.

The perfluroalkyl group-containing ethylenically unsaturated monomer is particularly preferably $CF_3CF_2(CF_2CF_2)_n CH_2CH_2OCOCH=CH_2$ (n=2 to 8).

The amount of the perfluoroalkyl group-containing ethylenically unsaturated monomer is from 40 to 100% by weight, preferably from 50 to 90% by weight, more preferably 55 to 85% by weight, based on the copolymer. If the perfluroalkyl group-containing ethylenically unsaturated monomer is in a small amount, the water- and oil-repellency is not good.

Non-limiting examples of a comonomer copolymerizable with the perfluroalkyl group-containing ethylenically unsaturated monomer are the following fluorine-free monomers, particularly fluorine-free functional group-containing monomers.

The fluorine-free monomer is preferably a diene monomer, a (meth)acrylate ester monomer or a di(meth)acrylate ester monomer.

Specific examples of the diene monomer include butadiene, isoprene and chloroprene.

The (meth)acrylate ester monomer may be a compound of the formula:

$$CH_2=CA^1COOA^2$$

or $$CH_2=CA^1COO(R^1—O)_n-A^2$$

wherein $A^1$ is a hydrogen atom or a methyl group, $A^2$ is a $C_1$-$C_{30}$ linear or branched alkyl group, $R^1$ is a $C_1$-$C_6$ linear or branched alkylene group, and n is an integer of 1 to 30.

The di(meth)acrylate ester monomer may be a compound of the formula:

$$CH_2=CA^1COO(R^1)_nOOCA^1C=CH_2$$

or $$CH_2=CA^1COO(R^1—O)_n—OCA^1C=CH_2$$

wherein $A^1$ is a hydrogen atom or a methyl group,
$R^1$ is a $C_1$-$C_6$ linear or branched alkylene group, and
n is an integer of 1 to 30.

The homopolymer of the fluorine-free monomer has the glass transition temperature of at most 50° C.

Examples of the monomer having a glass transition temperature of 30 to 50° C. include cetyl acrylate and isobutyl methacrylate for specific examples of the (meth)acrylate ester monomer; and polyethylene glycol(4) diacrylate for specific examples of the di(meth)acrylate ester monomer.

Examples of the monomer having a glass transition temperature of more than 0° C. and less than 30° C. include methyl acrylate, n-butyl methacrylate and cetyl methacrylate for specific examples of the (meth)acrylate ester monomer.

Examples of the monomer having a glass transition temperature of 0° C. or less include isoprene and 1,3-butadiene for specific examples of the diene monomer; and ethyl acrylate, n-butyl acrylate, n-octyl acrylate, 2-ethylhexyl (meth) acrylate and n-lauryl(meth)acrylate for specific examples of the (meth)acrylate ester monomer.

As the fluorine-free monomer, also suitable are $C_2$-$C_{14}$ alkyl (meth)acrylate, vinyl chloride (VCl), vinylidene chloride (VdCl), butadiene and chloroprene. The amount of the comonomer (the fluorine-free monomer) is preferably at most 60% by weight, more preferably at most 50% by weight, particularly preferably at most 45% by weight, based on the copolymer.

The copolymerizable fluorine-free functional group-containing monomer may be, for example, a compound of the formula:

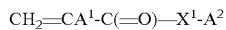

wherein $A^1$ is a hydrogen atom or a methyl group,
$X^1$ is —O—, —$CH_2$— or —NH—,
$A^2$ is a hydrogen atom, a hydrophilic group or a group containing a hydrophilic group.

Specific examples of the hydrophilic group in the fluorine-free functional group-containing monomer include a hydroxyl group, a glycidyl group, an ether group, an ester group, an amino group, a urethane group, a phosphate group and a sulfate group.

Specific examples of the fluorine-free functional group-containing monomer include glycidyl methacrylate, hydroxypropyl methacrylate, 2-hydroxy-3-phenoxypropyl acrylate, 2-hydroxyethyl acrylate, glycerol monomethacrylate, β-acryloyloxyethyl hydrogen succinate, β-methacryloyloxyethyl hydrogen phthalate, 2-acryloyloxyethylhexahydrophthalic acid, 2-acryloyloxyethylphthalic acid, 2-acryloyloxyethyl-2-hydroxyethylphthalic acid, hydroxypropyl methacrylate trimethylammonium chloride, dimethylaminoethyl methacrylate, diethylaminoethyl methacrylate, 2-acryloyloxyethyl acid phosphate, glucosylethyl methacrylate, methacrylamide, 2-acrylamido-2-methylpropanesulfonic acid, 2-hydroxy-3-acryloyloxypropyl methacrylate, 2-methacryloyloxyethyl acid phosphate and neopentyl glycol hydroxypivalate diacrylate.

Other examples of the fluorine-free functional group-containing monomer include 3-chloro-2-hydroxypropyl methacrylate, chloromethylstyrene, chlorostyrene, chloroethyl vinyl ether, tetrahydrofurfuryl (meth)acrylate and polyoxyethylene (meth)acrylate.

The amount of the fluorine-free functional group-containing monomer may be at most 20% by weight, preferably at most 15% by weight, more preferably at most 10% by weight, based on the copolymer.

The copolymer of the present invention can be prepared by emulsion polymerization, solution polymerization, suspension polymerization or bulk polymerization. In particular, the emulsion polymerization is preferred. Monomers are emulsion-polymerized by use of water, an emulsifying agent and optionally an organic solvent. The mixture may previously be emulsified by a high-pressure emulsifying machine or the like before polymerization.

The emulsifying agent used may be any type of a surfactant, such as a cationic, anionic, nonionic or amphoteric surfactant. Examples of the cationic and nonionic surfactants are as mentioned above. Specific examples of the anionic surfactant include sodium lauryl sulfate, lauryl sulfate triethanolamine, sodium polyoxyethylene lauryl ether sulfate, sodium polyoxyethylene nonyl phenyl ether sulfate, polyoxyethylene lauryl ether sulfate triethanolamine, sodium cocoyl sarcosine, sodium N-cocoyl methyl taurine, sodium polyoxyethylene coconut alkyl ether sulfate, sodium diether hexyl sulfosuccinate, sodium α-olefin sulfonate, sodium lauryl phosphate, sodium polyoxyethylene lauryl ether phosphate, and perfluoroalkyl carboxylate salt (UNIDYNE DS-101 and 102 manufactured by Daikin Industries, Ltd.).

Examples of the organic solvent used in the emulsion polymerization are as follows: Ketones such as acetone, methyl ethyl ketone and methyl isobutyl ketone; alcohols such as ethanol, isopropanol and butanol; polyhydric alcohols such as 1,3-butanediol, 1,6-hexanediol, ethylene glycol, propylene glycol, dipropylene glycol, tripropylene glycol and glycerol; ethers and esters of polyhydric alcohol such as dipropylene glycol monomethyl ether, tripropylene glycol monomethyl ether, triethylene glycol dimethyl ether and diethylene glycol monobutyl ether acetate; esters such as ethyl acetate, propyl acetate, butyl acetate, dibutyl adipate and dibutyl succinate; hydrocarbon and halogenated hydrocarbon such as toluene, xylene, octane, perchloroethylene and 1,3-dichloro-2,2,3,3,3-pentafluoropropane.

The composition of the present invention can be prepared by emulsion-polymerizing the perfluoroalkyl group-containing ethylenically unsaturated monomer in the presence of the specified amounts of the nonionic surfactant having low HLB and the cationic surfactant.

Alternatively, the composition of the present invention can be prepared by emulsion-polymerizing the perfluoroalkyl group-containing ethylenically unsaturated monomer in the presence of either the nonionic surfactant having low HLB or the cationic surfactant, and then adding the surfactants to give the specified amounts of the nonionic surfactant having low HLB and the cationic surfactant.

In addition to the above-mentioned copolymer, surfactant and solvent, the composition of the present invention may contain various additives such as softening agents, cross-linking agents, antistatic agents, flame-retardants and anti-microbial agents.

The composition of the present invention can be applied to a substrate according to a conventionally known method. A method of dispersing the composition into water to dilute it, attaching it on the substrate by a procedure such as dip application, spray application and coat application to the substrate, and drying and/or heat-treating it is usually adopted. The temperature of curing is generally from 80° C. to 180° C., particularly from 80° C. to 140° C.

The concentration of the copolymer is generally from 0.1% to 70% by weight, based on the composition of the present invention. When the composition is diluted with and dispersed in water, the concentration of the copolymer in the treatment liquid may be from 0.01% to 10% by weight, preferably from 0.05% to 5% by weight When the substrate is dried and/or heat-treated, the temperature may be at least 150° C., but the temperature limited in view of the heat resistance of the substrate may be at most 140° C., particularly from 80° C. to 120° C. so as to give sufficient properties.

The substrate (or article) to be treated with the composition of the present invention is preferably a textile. As the textile, various examples can be mentioned. Examples of them include a natural fiber such as cotton, hemp, silk and wool; a synthetic fiber such as a polyamide, a polyester, polyacrylonitrile, polyvinyl chloride and polypropylene; a semi-synthetic fiber such as rayon and acetate; an inorganic fiber such as glass fiber, carbon fiber and asbestos fiber; and a mixture of these fibers. Because the composition of the present invention has the characteristics of exhibiting sufficient properties after drying and/or heat treatment even at not higher than 140° C., it can be effectively applied to a fiber of polyolefin having poor heat resistance, such as polypropylene and polyethylene.

The textile may be any of in the form of yarn, fabric and the like.

Examples of the substrate which can be treated with the composition of the present invention include glass, paper, wood, leather, fur, metal and plastics, in addition to the textile.

The substrate treated with the composition of the present invention can be used in various uses and is not limited. The composition of the present invention can be effectively used in furniture applications, and medical and sanitary applications using polyolefin fibers such as polypropylene fibers and polyethylene fibers, and textile blends thereof which can not obtain sufficient performances by conventional technologies.

PREFERRED EMBODIMENTS OF THE INVENTION

The following Examples and Comparative Examples, which do not limit the present invention, further illustrate the present invention in detail. In the Examples and Comparative Examples, "%" is "% by weight" unless otherwise specified.

The properties are measured as follows.

Water Repellency

Aqueous solution of isopropyl alcohol (IPA) shown in Table 1 is positioned on a test fabric, the water-repellency is evaluated according to AATCC-TM118-1992 and then expressed as water-repellency grade shown in Table 1.

TABLE 1

| Water repellency grade | Test liquid (volume ratio %) |
|---|---|
| 10 | IPA 100 |
| 9 | IPA 90/water 10 |
| 8 | IPA 80/water 20 |
| 7 | IPA 70/water 30 |
| 6 | IPA 60/water 40 |
| 5 | IPA 50/water 50 |
| 4 | IPA 40/water 60 |
| 3 | IPA 30/water 70 |
| 2 | IPA 20/water 80 |
| 1 | IPA 10/water 90 |
| W | Water 100 |
| 0 | Inferior to W |

Oil-Repellency

According to AATCC-TM118-1992, several droplets (diameter: 4 mm) of the test liquid shown in Table 2 are positioned on two sites of test fabric, and penetration states of the test liquid are determine after 30 seconds. The oil-repellency is expressed by the oil-repellency grade shown in Table 2.

TABLE 2

| Oil repellency grade | Test solution | Surface tension (dyne/cm, 25° C.) |
|---|---|---|
| 8 | n-Heptane | 20.0 |
| 7 | n-Octane | 21.3 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture of n-hexadecane/nujol (35/65) | 29.6 |
| 1 | Nujol | 31.2 |
| 0 | Inferior to 1 | — |

Preparative Example 1

Preparation of Water-Based Water- and Oil-Repellent Agent

A monomer [70 g of perfluoroalkyl ethyl acrylate (FA) [$C_nF_{2n+1}CH_2CH_2COOCH=CH_2$ (a mixture of compounds wherein n is 6, 8, 10, 12 and 14 (average of n is 9))], 25 g of lauryl acrylate (LA), 2.5 g of N-methylol acrylamide (N-MAM) and 2.5 g of 3-chloro-2-hydroxypropyl methacrylate (CHPMA)], an emulsifying agent [2 g of di-harden tallow alkyl dimethyl ammonium chloride (cationic surfactant A), 2 g of lauryl trimethyl ammonium chloride (cationic surfactant B) and 7 g of polyoxyethylene(8) distearate (nonionic surfactant A, HLB value: 8.5)], a solvent (30 g of tripropylene glycol (TPG)), a chain transfer agent (0.5 g of dodecylmercaptan) and 191 g of water were charged, mixed with a homomixer and then emulsified with an ultrasonic emulsifier. The flask was replaced with nitrogen, an initiator (0.6 g of 2,2'-azobis(2-amidinopropane) dihydrochloride) was added and the polymerization was conducted at 60° C. over 4 hours. The disappearance of the monomers was confirmed by GC. The resultant water- and oil-repellent composition had a solid content (residue after evaporation at 130° C. over 2 hours) of 33%.

Preparative Examples 2 to 14 and Comparative Preparative Examples 1 to 3

Preparation of Water-Based Water- and Oil-Repellent Agent

Types and amounts of monomers and emulsifying agents shown in Table A were used in the same manner as in Preparative Example 1 to give a water- and oil-repellent composition.

Preparative Example 15

Preparation of Water-Based Water- and Oil-Repellent Agent

A monomer [70 g of perfluoroalkylethyl acrylate (FA) [$C_nF_{2n+1}CH_2 CH_2COOCH=CH_2$ (a mixture of compounds wherein n is 6, 8, 10, 12 and 14 (average of n is 9))], 20 g of lauryl acrylate (LA), 2.5 g of N-methylol acrylamide (N-MAM) and 2.5 g of 3-chloro-2-hydroxypropyl methacrylate (CHPMA)], an emulsifying agent [2 g of di-harden tallow alkyl dimethyl ammonium chloride (cationic surfactant A), 2 g of lauryl trimethyl ammonium chloride (cationic surfactant B), 5 g of polyoxyethylene(8) distearate (nonionic surfactant A, HLB value: 8.5) and branched primary lauryl alcohol POP(6) POE(20) adduct (nonionic surfactant L, HLB value: 12.3)], a solvent (30 g of tripropylene glycol (TPG), a chain transfer agent (0.5 g of dodecyl mercaptan) and 191 g of water were charged, mixed with a homomixer and then emulsified with an ultrasonic emulsifier. The emulsified liquid was charged into an autoclave and degassed to vacuum, and 7.1 g of a vinyl chloride monomer was charged. An initiator (0.6 g of 2,2'-azobis(2-amidinopropane) dihydrochloride) was added to conduct the polymerization at 60° C. over 4 hours. After the completion of the polymerization, unreacted vinyl chloride monomer was removed off (The conversion of the vinyl chloride monomer was 70%). The disappearance of the other monomers was confirmed by GC. The resultant water- and oil-repellent composition had a solid content (residue after evaporation at 130° C. over 2 hours) of 33%.

Preparative Examples 16 to 19

Preparation of Water-Based Water- and Oil-Repellent Agent

Types and amounts of monomers and emulsifying agents shown in Table B were used in the same manner as in Preparative Example 15 to give a water- and oil-repellent composition.

Example 1

The water- and oil-repellent composition obtained in Preparative Example 1 was diluted with water to give a water- and oil-repellent treatment liquid having a solid content of 0.5%. A cotton fabric (broad) and a polypropylene (PP) fabric (twill weave) were dipped into this treatment liquid and squeezed with rolls. The wet pick up was 65% for the cotton fabric and 75% for the PP fabric. These treated fabrics were dried with a pin tenter at 120° C. for 3 minutes. Then the water- and oil-repellency test was conducted. The test results are shown in Table A.

Examples 2 to 19 and Comparative Examples 1 to 3

The water- and oil-repellent composition obtained in Preparative Examples 2 to 19 and Comparative Preparative Examples 1 to 3 was subjected to the water- and oil-repellency test as in Example 1. Test results are shown in Table A.

Preparative Example 20

Preparation of Water-Based Water- and Oil-Repellent Agent

The composition obtained in Comparative Preparative Example 2 was diluted with water to a solid content of 0.5%, and polyoxyethylene(8) distearate (nonionic surfactant A, HLB value: 8.5) in the amount of 0.1% relative to the diluted liquid was added to give a water- and oil-repellent composition.

Preparative Examples 21 to 28 and Comparative Preparative Examples 5 and 6

Preparation of Water-Based Water- and Oil-Repellent Agent

In the same manner as in Preparative Example 20, the composition obtained in Comparative Preparative Example 2 was diluted with water to a solid content of 0.5%, a nonionic surfactant shown in Table C in the amount of 0.3% relative to the diluted liquid was added to give a water- and oil-repellent composition.

Example 20

The water- and oil-repellent composition obtained in Preparative Example 20 as such was used as a water- and oil-repellent treatment liquid. A cotton fabric (broad) and a polypropylene (PP) non-woven fabric were dipped into this treatment liquid and squeezed with rolls. The wet pick up was 65% for the cotton fabric and 170% for the PP non-woven fabric. These treated fabrics were dried with a pin tenter at 80° C. for 5 minutes. Then the water- and oil-repellency test was conducted. The test results are shown in Table C.

Examples 21 to 28 and Comparative Examples 5 and 6

The water- and oil-repellent composition obtained in Preparative Examples 19 to 26 and Comparative Preparative Examples 5 and 6 was subjected to the water- and oil-repellency test as in Example 20. Test results are shown in Table C.

Comparative Example 4

The water- and oil-repellent composition obtained in Comparative Preparative Example 2 was diluted with water to a solid content of 0.5%, and the diluted liquid as such was used as a water- and oil-repellent treatment liquid. The water- and oil-repellency test was conducted as in Example 20. Test results are shown in Table C.

Example 29

The water- and oil-repellent composition obtained in Preparative Example 1 was diluted with water to give a water- and oil-repellent treatment liquid having a solid content of 0.5%. A propylene (PP) fabric for furniture (weight per unit area of fabric: 197 g/m$^2$, a propylene (PP)/cotton union fabric for furniture (weight per unit area of fabric: 380 g/m$^2$, a cotton fabric for furniture (weight per unit area of fabric: 235 g/m$^2$) and a propylene non-woven fabric for medical use (weight per unit area of fabric: 40 g/m$^2$) were dipped into this treatment liquid and squeezed with rolls. These treated fabrics were dried with a pin tenter and the water- and oil-repellency test was conducted. The wet pick up and drying conditions were 64%; 100° C. and 3 minutes for the furniture use PP fabric; 67%; 80° C. and 6 minutes for the furniture use PP/cotton union fabric; 71%; 80° C. and 3 minutes for the furniture use cotton fabric; and 130%; 90° C. and 2 minutes for the medical use PP non-woven fabric. The test results are shown in Table D.

11
Comparative Preparative Example 7

Types and amounts of monomers and emulsifying agents shown in Table D were used in the same manner as in Preparative Example 1 to give a water- and oil-repellent composition.

12
Comparative Example 7

The water- and oil-repellent composition obtained in Comparative Preparative Example 7 was subjected to the water- and oil-repellency test as in Example 29. Test results are shown in Table D.

TABLE A

| | | Example | | | | | | | | | | | | | | |
|---|---|---|---|---|---|---|---|---|---|---|---|---|---|---|---|---|
| | HLB | 1 | 2 | 3 | 4 | 5 | 6 | 7 | 8 | 9 | 10 | 11 | 12 | 13 | 14 |
| FA | | 70 | 70 | 70 | 70 | 70 | 70 | 70 | 70 | 70 | 70 | 70 | 70 | 70 | 70 |
| LA | | 25 | 25 | 25 | 25 | 25 | 25 | 25 | 25 | 25 | 25 | 25 | — | 25 | 25 |
| 2EHA | | — | — | — | — | — | — | — | — | — | — | — | 25 | — | — |
| N-MAM | | 2.5 | 2.5 | 2.5 | 2.5 | 2.5 | 2.5 | 2.5 | 2.5 | 2.5 | 2.5 | 2.5 | 2.5 | 2.5 | 2.5 |
| CHPMA | | 2.5 | 2.5 | 2.5 | 2.5 | 2.5 | 2.5 | 2.5 | 2.5 | 2.5 | 2.5 | 2.5 | 2.5 | — | — |
| CMS | | — | — | — | — | — | — | — | — | — | — | — | — | 2.5 | 2.5 |
| Cationic surfactant A | | 2 | 2 | 2 | 2 | 2 | 2 | 2 | 2 | 2 | 2 | 2 | 2 | 2 | 2 |
| Cationic surfactant B | | 2 | 2 | 2 | 2 | 2 | 2 | 2 | 2 | 2 | 2 | 2 | 2 | 2 | 2 |
| Nonionic surfactant A | 8.5 | 7 | | | | | | | | | | | 7 | 7 | 4.2 |
| Nonionic surfactant B | 9.5 | | 7 | | | | | | | | | | | | |
| Nonionic surfactant C | 8.0 | | | 7 | | | | | | | | | | | |
| Nonionic surfactant D | 10.5 | | | | 7 | | | | | | | | | | |
| Nonionic surfactant E | 8.0 | | | | | 7 | | | | | | | | | |
| Nonionic surfactant F | 7.5 | | | | | | 7 | | | | | | | | |
| Nonionic surfactant G | 8.6 | | | | | | | 7 | | | | | | | |
| Nonionic surfactant H | 4.0 | | | | | | | | 7 | | | | | | |
| Nonionic surfactant I | 6.5 | | | | | | | | | 7 | | | | | |
| Nonionic surfactant J | 8.5 | | | | | | | | | | 7 | | | | |
| Nonionic surfactant K | 11.0 | | | | | | | | | | | 7 | | | |
| Nonionic surfactant L | 12.3 | | | | | | | | | | | | | | 2.8 |
| PP fabric (twill) | | | | | | | | | | | | | | | |
| Water-repellency (IPA/water) | | 9 | 8 | 9 | 8 | 9 | 9 | 8 | 9 | 9 | 9 | 8 | 9 | 9 | 9 |
| Oil-repellency | | 4 | 3 | 4 | 3 | 4 | 4 | 3 | 4 | 3 | 3 | 3 | 4 | 4 | 4 |
| Cotton fabric (broad) | | | | | | | | | | | | | | | |
| Water-repellency (IPA/water) | | 7 | 6 | 6 | 6 | 6 | 6 | 5 | 5 | 5 | 6 | 6 | 6 | 7 | 7 |
| Oil-repellency | | 4 | 4 | 4 | 3 | 3 | 3 | 3 | 3 | 4 | 4 | 4 | 4 | 4 | 4 |

Note)
FA: Perfluoroalkylethyl acrylate
LA: Lauryl acrylate
2EHA: 2-Ethylhexyl acrylate
N-MAM: N-Methylol acrylamide
CHPMA: 2-Hydroxy-3-chloropropyl methacrylate
CMS: Chloromethylstyrene
Cationic surfactant A: Di-harden tallow alkyl dimethyl ammonium chloride
Cationic surfactant B: Lauryl trimethyl ammonium chloride
Nonionic surfactant A: POE(8) distearate
Nonionic surfactant B: POE(8) diisostearate
Nonionic surfactant C: POE(3) secondary alkyl ether
Nonionic surfactant D: POE(5) secondary alkyl ether
Nonionic surfactant E: POE(2) cetyl ether
Nonionic surfactant F: POE(2) oleyl ether
Nonionic surfactant G: Sorbitan monolaurate
Nonionic surfactant H: POE(2) monostearate
Nonionic surfactant I: POE(4) monostearate
Nonionic surfactant J: POE(6) monooleate
Nonionic surfactant K: POE(10) monostearate
Nonionic surfactant L: Branched primary lauryl alcohol POP(6) POE(20) adduct

TABLE B

| | | Example | | | | | Comparative Example | | |
|---|---|---|---|---|---|---|---|---|---|
| | HLB | 15 | 16 | 17 | 18 | 19 | 1 | 2 | 3 |
| FA | | 70 | 80 | 80 | 80 | 80 | 70 | 70 | 70 |
| StA | | — | — | — | — | — | — | — | 25 |

TABLE B-continued

|  | HLB | Example 15 | Example 16 | Example 17 | Example 18 | Example 19 | Comparative Example 1 | Comparative Example 2 | Comparative Example 3 |
|---|---|---|---|---|---|---|---|---|---|
| LA |  | 20 | — | — | — | — | 25 | 25 | — |
| VCl |  | 5 | 15 | — | — | — | — | — | — |
| VdCl |  | — | — | 15 | — | — | — | — | — |
| Butadiene |  | — | — | — | 15 | — | — | — | — |
| Chloroprene |  | — | — | — | — | 15 | — | — | — |
| N-MAM |  | 2.5 | 2.5 | 2.5 | 2.5 | 2.5 | 2.5 | 2.5 | 2.5 |
| CHPMA |  | 2.5 | 2.5 | 2.5 | 2.5 | 2.5 | 2.5 | 2.5 | 2.5 |
| Cationic surfactant A |  | 2 | 2 | 2 | 2 | 2 | 2 | — | 2 |
| Cationic surfactant C |  | — | — | — | — | — | — | 3 | — |
| Cationic surfactant B |  | 2 | 2 | 2 | 2 | 2 | 2 | — | 2 |
| Nonionic surfactant A | 8.5 | 5 | 5 | 5 | 5 | 5 | — | — | 7 |
| Nonionic surfactant L | 12.3 | 2 | 2 | 2 | 2 | 2 | — | — | — |
| Nonionic surfactant M | 15.0 | — | — | — | — | — | 7 | — | — |
| Nonionic surfactant N | 16.2 | — | — | — | — | — | — | 7 | — |
| PP fabric (twill) |  |  |  |  |  |  |  |  |  |
| Water-repellency (IPA/water) |  | 10 | 8 | 8 | 8 | 8 | 5 | 3 | 4 |
| Oil-repellency |  | 4 | 3 | 3 | 3 | 3 | 0 | 0 | 1 |
| Cotton fabric (broad) |  |  |  |  |  |  |  |  |  |
| Water-repellency (IPA/water) |  | 6 | 5 | 5 | 5 | 5 | 4 | 3 | 3 |
| Oil-repellency |  | 4 | 5 | 4 | 4 | 4 | 3 | 1 | 2 |

Note)
StA: Stearyl acrylate
VCl: Vinyl chloride
VdCl: Vinylidene chloride
Nonionic surfactant A: POE(8) distearate
Nonionic surfactant L: Branched primary lauryl alcohol POP(6) POE(20) adduct
Nonionic surfactant M: POE(25) monostearate
Nonionic surfactant N: POE(20) octylphenyl ether
Cationic surfactant A: Di-harden tallow alkyl dimethyl ammonium chloride
Cationic surfactant B: Lauryl trimethyl ammonium chloride
Cationic surfactant C: Stearyl trimethyl ammonium chloride

TABLE C

|  | HLB | Example 20 | Example 21 | Example 22 | Example 23 | Example 24 | Example 25 | Example 26 | Example 27 | Example 28 | Comparative Example 4 | Comparative Example 5 | Comparative Example 6 |
|---|---|---|---|---|---|---|---|---|---|---|---|---|---|
| Composition of Preparative Example 2 | Comparative | 0.5 | 0.5 | 0.5 | 0.5 | 0.5 | 0.5 | 0.5 | 0.5 | 0.5 | 0.5 | 0.5 | 0.5 |
| Nonionic surfactant A | 8.5 | 0.1 | 0.3 |  |  |  |  |  |  |  |  |  |  |
| Nonionic surfactant B | 9.5 |  |  | 0.3 |  |  |  |  |  |  |  |  |  |
| Nonionic surfactant J | 8.5 |  |  |  | 0.3 |  |  |  |  |  |  |  |  |
| Nonionic surfactant C | 8.0 |  |  |  |  | 0.3 |  |  |  |  |  |  |  |
| Nonionic surfactant D | 10.5 |  |  |  |  |  | 0.3 |  |  |  |  |  |  |
| Nonionic surfactant E | 8.0 |  |  |  |  |  |  | 0.3 |  |  |  |  |  |
| Nonionic surfactant F | 7.5 |  |  |  |  |  |  |  | 0.3 |  |  |  |  |
| Nonionic surfactant G | 8.6 |  |  |  |  |  |  |  |  | 0.3 |  |  |  |
| Nonionic surfactant O | 16.5 |  |  |  |  |  |  |  |  |  | 0.3 |  |  |
| Nonionic surfactant M | 15.0 |  |  |  |  |  |  |  |  |  |  | 0.3 |  |
| PP non-woven fabric |  |  |  |  |  |  |  |  |  |  |  |  |  |
| Water-repellency (IPA/water) |  | 6 | 9 | 8 | 9 | 10 | 7 | 9 | 9 | 9 | 3 | 3 | 3 |
| Oil-repellency |  | 2 | 4 | 3 | 3 | 5 | 2 | 3 | 3 | 2 | 0 | 0 | 0 |
| Cotton fabric |  |  |  |  |  |  |  |  |  |  |  |  |  |

TABLE C-continued

| | HLB | Example 20 | 21 | 22 | 23 | 24 | 25 | 26 | 27 | 28 | Comparative Example 4 | 5 | 6 |
|---|---|---|---|---|---|---|---|---|---|---|---|---|---|
| (broad) | | | | | | | | | | | | | |
| Water-repellency (IPA/water) | | 4 | 5 | 4 | 4 | 4 | 3 | 4 | 4 | 3 | 2 | 0 | 0 |
| Oil-repellency | | 3 | 3 | 2 | 2 | 3 | 2 | 3 | 3 | 2 | 1 | 0 | 0 |

Note)
Nonionic surfactant A: POE(8) distearate
Nonionic surfactant B: POE(8) diisostearate
Nonionic surfactant J: POE(6) monooleate
Nonionic surfactant C: POE(3) secondary alkyl ether
Nonionic surfactant D: POE(5) secondary alkyl ether
Nonionic surfactant E: POE(2) cetyl ether
Nonionic surfactant F: POE(2) oleyl ether
Nonionic surfactant G: Sorbitan monolaurate
Nonionic surfactant O: POE(150) distearate
Nonionic surfactant M: POE(25) monostearate

TABLE D

| | HLB | Example 29 | Comparative Example 7 |
|---|---|---|---|
| FA | | 70 | 70 |
| LA | | 25 | — |
| StA | | — | 25 |
| N-MAM | | 2.5 | 2.5 |
| CHPMA | | 2.5 | 2.5 |
| Cationic surfactant A | | 2 | — |
| Cationic surfactant B | | 2 | — |
| Cationic surfactant C | | — | 3 |
| Nonionic surfactant A | 8.5 | 7 | — |
| Nonionic surfactant N | 16.2 | — | 7 |
| Furniture use PP fabric | | | |
| Water-repellency(IPA/water) | | 7 | 2 |
| Oil-repellency | | 4 | 1 |
| Furniture use PP/cotton union fabric | | | |
| Water-repellency(IPA/water) | | 10 | 0 |
| Oil-repellency | | 6 | 0 |
| Furniture use cotton fabric | | | |
| Water-repellency(IPA/water) | | 10 | 0 |
| Oil-repellency | | 7 | 0 |
| Medical use PP non-woven fabric | | | |
| Water-repellency(IPA/water) | | 9 | 2 |
| Oil-repellency | | 3 | 0 |

EFFECTS OF THE INVENTION

The aqueous dispersion type fluorine-containing water- and oil-repellent agent of the present invention has excellent water- and oil-repellency performances when cured at low temperature.

The invention claimed is:

1. An aqueous dispersion type fluorine-containing water- and oil-repellent composition comprising a polymer of a perfluoroalkyl group-containing ethylenically unsaturated monomer in an amount of 50 to 90% by weight, based on the polymer, and at least one fluorine-free monomer dispersed in an aqueous medium, wherein the composition contains a nonionic surfactant having an HLB value of at most 11 and a cationic surfactant, and a homopolymer of the at least one fluorine-free monomer constituting the polymer has a glass transition temperature (Tg) of at most 50° C.,
wherein the cationic surfactant is at least one selected from the group consisting of monoalkyl trimethyl ammonium salts and dialkyl dimethyl ammonium salts, and
wherein the perfluoroalkyl group-containing ethylenically unsaturated monomer is represented by the formula:

$$Rf-R^1-OOCC(R^2)=CH_2$$

wherein Rf is a linear or branched perfluoroalkyl group having 6 to 14 carbon atoms;
$R^1$ is a linear or branched alkylene group having 1 to 20 carbon atoms; and
$R^2$ is a hydrogen atom or a methyl group,
wherein the nonionic surfactant is at least one selected from the group consisting of polyoxyalkylenedialkyl esters, polyoxyalkylenealkyl esters and polyoxyalkylenealkyl ethers, and
wherein all of the cationic surfactant contained in the composition is a fluorine-free surfactant.

2. The composition according to claim 1, wherein the nonionic surfactant has an HLB value of at most 9.

3. The composition according to claim 2, wherein the composition contains a nonionic surfactant having an HLB value of 9 to 13 in addition to the nonionic surfactant having an HLB value of at most 9.

4. The composition according to claim 3, wherein the amount of the nonionic surfactant having an HLB value of at most 9 is at least 60% by weight, based on the total of the nonionic surfactant.

5. The composition according to claim 1, wherein the amount of the nonionic surfactant is from 0.1 to 100 parts by weight, based on 100 parts by weight of the polymer.

6. The composition according to claim 1, wherein $R^1$ is a —$CH_2CH_2$— group.

7. An aqueous dispersion type fluorine-containing water- and oil-repellent composition comprising a polymer of a perfluoroalkyl group-containing ethylenically unsaturated monomer in an amount of 50 to 90% by weight, based on the polymer, and at least one fluorine-free monomer dispersed in an aqueous medium, wherein the composition contains a nonionic surfactant having an HLB value of at most 11 and a cationic surfactant, and wherein the at least one fluorine-free monomer constituting the polymer is at least one selected from the group consisting of $C_2$-$C_{14}$ alkyl (meth)acrylates, vinyl chloride (VCl), vinylidene chloride (VdCl), butadiene and chloroprene, wherein the cationic surfactant is at least one selected from the group consisting of monoalkyl trimethyl ammonium salts and dialkyl dimethyl ammonium salts, and wherein the perfluoroalkyl group-containing ethylenically unsaturated monomer is represented by the formula:

$$Rf-R^1-OOCC(R^2)=CH_2$$

wherein Rf is a linear or branched perfluoroalkyl group having 6 to 14 carbon atoms;
$R^1$ is a linear or branched alkylene group having 1 to 20 carbon atoms; and
$R^2$ is a hydrogen atom or a methyl group, wherein the nonionic surfactant is at least one selected from the group consisting of polyoxyalkylenedialkyl esters, polyoxyalkylenealkyl esters and polyoxyalkylenealkyl ethers, and wherein all of the cationic surfactant contained in the composition is a fluorine-free surfactant.

8. The composition according to claim 7, wherein $R^1$ is a —$CH_2CH_2$— group.

9. A method of producing the aqueous dispersion type fluorine-containing water- and oil-repellent composition according to claim 1, wherein a monomer is polymerized in the presence of both the nonionic surfactant having an HLB value of at most 11 and the cationic surfactant by an emulsion polymerization process to give the polymer.

10. A method of producing an aqueous dispersion type fluorine-containing water- and oil-repellent composition comprising a polymer of a perfluoroalkyl group-containing ethylenically unsaturated monomer in an amount of 50 to 90% by weight, based on the polymer, and at least one fluorine-free monomer dispersed in an aqueous medium, wherein the composition contains a nonionic surfactant having an HLB value of at most 11 and a cationic surfactant, and a homopolymer of the at least one fluorine-free monomer constituting the polymer has a glass transition temperature (Tg) of at most 50° C., wherein the cationic surfactant is at least one selected from the group consisting of monoalkyl trimethyl ammonium salts and dialkyl dimethyl ammonium salts, and wherein the method comprises polymerizing the perfluoroalkyl group-containing ethylenically unsaturated monomer in the presence of the cationic surfactant, and then adding the nonionic surfactant having an HLB value of at most 11, and wherein the perfluoroalkyl group-containing ethylenically unsaturated monomer is represented by the formula:

$$Rf-R^1-OOCC(R^2)=CH_2$$

wherein Rf is a linear or branched perfluoroalkyl group having 6 to 14 carbon atoms;
$R^1$ is a linear or branched alkylene group having 1 to 20 carbon atoms; and
$R^2$ is a hydrogen atom or a methyl group, wherein the nonionic surfactant is at least one selected from the group consisting of polyoxyalkylenedialkyl esters, polyoxyalkylenealkyl esters and polyoxyalkylenealkyl ethers, and wherein all of the cationic surfactant contained in the composition is a fluorine-free surfactant.

11. The method according to claim 10, wherein $R^1$ is a —$CH_2CH_2$— group.

12. A treatment method comprising treating a textile with the composition according to claim 1 and then drying and/or heat-treating the textile.

13. The treatment method according to claim 12, wherein the drying and/or heat-treatment is conducted at a temperature of at most 140° C.

14. An article treated with the method according to claim 12.

15. The article according to claim 14, wherein the article is a polyolefin fiber.

16. The article according to claim 14, wherein the article is for furniture use, or for medical or sanitary use.

17. The article according to claim 14, wherein the article comprises at least one fiber selected from the group consisting of a natural fiber, a synthetic fiber, a semi-synthetic fiber, an inorganic fiber and a mixture of these fibers.

18. The article according to claim 14, wherein the article comprises at least one fiber selected from the group consisting of polypropylene fiber, polyester fiber and cotton fiber.

* * * * *